United States Patent [19]

Yanagida

[11] Patent Number: 4,525,658
[45] Date of Patent: Jun. 25, 1985

[54] SERVOMOTOR DRIVE SYSTEM

[75] Inventor: Shoji Yanagida, Yokohama, Japan

[73] Assignee: Ricoh Co., Ltd., Japan

[21] Appl. No.: 620,945

[22] Filed: Jun. 15, 1984

[30] Foreign Application Priority Data

Jun. 15, 1983 [JP] Japan .................................. 58-107287

[51] Int. Cl.³ ............................................. H02P 5/00
[52] U.S. Cl. .................................... 318/317; 318/311;
318/318; 318/345 A; 318/341; 318/257;
318/599; 318/696
[58] Field of Search ............... 318/311, 312, 313, 314,
318/315, 317, 318, 322, 329, 333, 341, 342, 345
A, 345 B, 257, 258, 607, 608, 599, 331, 332, 696

[56] References Cited

U.S. PATENT DOCUMENTS

| | | | |
|---|---|---|---|
| 3,523,228 | 8/1970 | Currie et al. | 318/599 |
| 3,757,193 | 9/1973 | Inaba et al. | 318/696 |
| 4,066,945 | 1/1978 | Korte, Jr. | 318/599 |
| 4,119,897 | 10/1978 | Skoog | 318/331 |
| 4,210,851 | 7/1980 | Wakamiya | 318/257 |
| 4,268,782 | 5/1981 | Kawada et al. | 318/332 X |
| 4,271,382 | 6/1981 | Maeda et al. | 318/318 |
| 4,295,080 | 10/1981 | Fujita et al. | 318/257 |
| 4,300,081 | 11/1981 | Van Landingham | 318/341 X |
| 4,338,640 | 7/1982 | Yabu et al. | 318/318 X |
| 4,409,527 | 10/1983 | Sommeria | 318/311 X |

Primary Examiner—S. J. Witkowski
Assistant Examiner—Paul Shik Luen Ip
Attorney, Agent, or Firm—Guy W. Shoup

[57] ABSTRACT

Herein disclosed is a drive system for a servomotor for use with the carriage of a serial printer, comprising a source of a variable command signal representative of the speed at which the servomotor is to operate, detecting means for detecting the output speed of the servomotor and producing a signal representative of the detected servomotor output speed, and first and second voltage sources respectively operative to supply predetermined voltages, the voltage from the first voltage source being higher than the voltage from the second voltage source. The drive system further comprises switching means responsive to the detected speed signal and operative to select the first voltage source when the detected speed signal is increased in voltage to a first threshold level and select the second voltage source when the detected speed signal is decreased in voltage to a second threshold level lower than the first threshold level, and drive means responsive to the command signal and operative to provide a path of current from the voltage source selected by the switching means to the servomotor.

8 Claims, 4 Drawing Figures

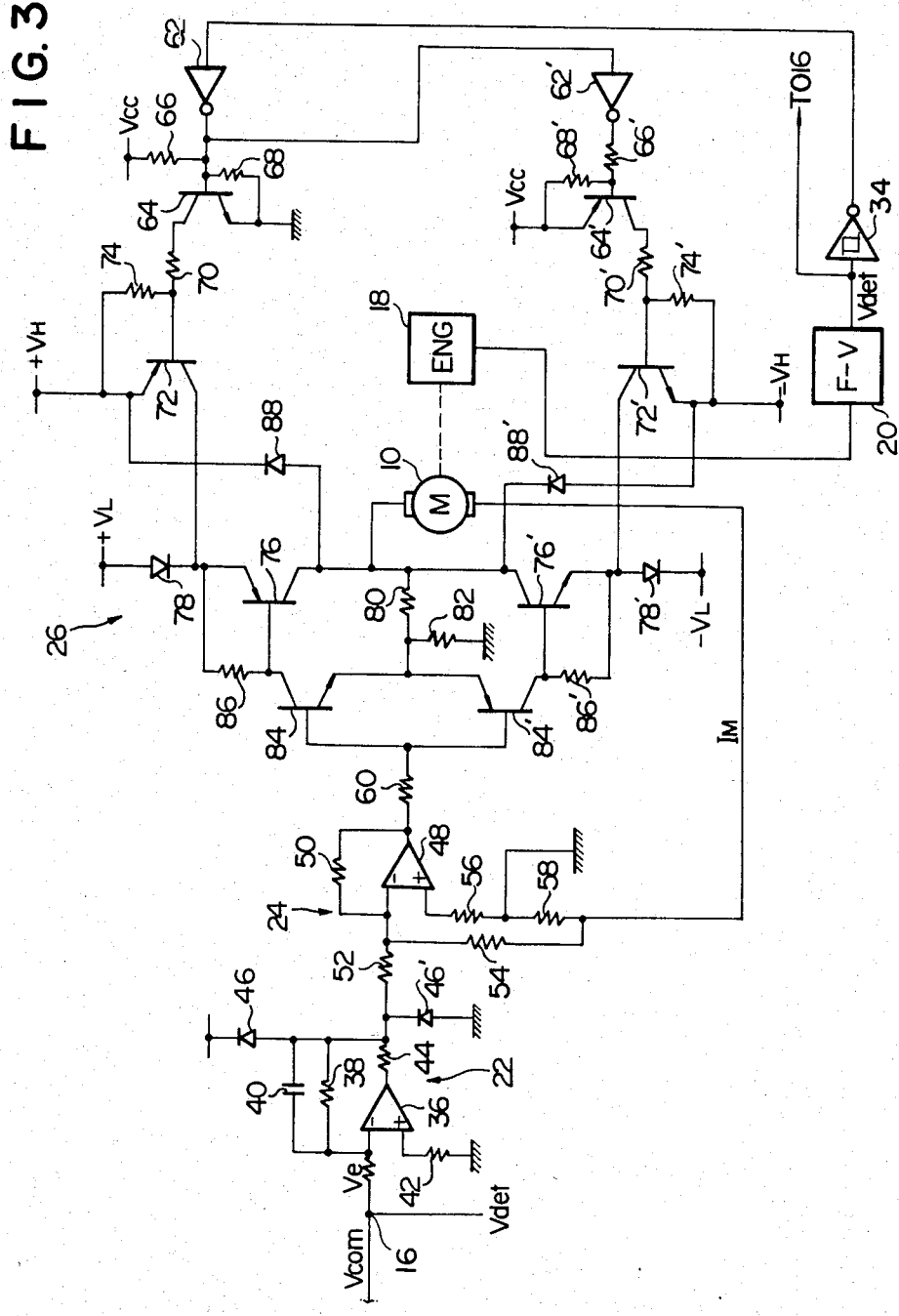
F I G. 3

SERVOMOTOR DRIVE SYSTEM

FIELD OF THE INVENTION

The present invention relates to motor drive systems, and particularly, to a system for driving a servomotor for use typically in a serial printer to be coupled with, for example, a computer or a word processor.

BACKGROUND OF THE INVENTION

A serial printer for use with a computer or a word processor has incorporated therein a reversible d.c. servomotor to drive the carriage of the printer. As well known in the art, such a servomotor operates to drive the carriage for movement (spacing movement) from one printing position to another, for movement (carriage return movement) from an end-of-the-line position to a preset left-margin position, and for movement (tabulating movement) from a preset position to a tabulation stop position. The latter two modes of movement of the printer carriage require the servomotor to operate at far higher speeds than the speed required for the spacing movement of the carriage. In some serial printers, the carriage drive servomotors are required to operate for carriage return or tabulating movement at speeds which are two to six times higher than the maximum speeds of operation of the servomotors for the spacing movement of the carriages. The spacing movement of the carriage as herein mentioned is the movement of the carriage from one letter to another, from a letter to a space between words, or from a space between words to a letter.

The source voltage, $V_S$, for the servomotor of a serial printer is generally given as $$V_S > (\omega_{max} \times K_E) + (I_{M(max)} \times R_a) + V_{CE(sat)} \qquad \text{Exp. 1}$$

where $\omega_{max}$ represents the maximum angular velocity (rad/sec) of the motor output shaft as required for the carriage return or tabulating movement of the printer carriage, $K_E$ represents the inductive voltage coefficient (volt/rad/sec), $I_{M(max)}$ represents the maximum current supplied to the servomotor, $R_a$ represents the resistance between the terminals of the servomotor, and $V_{CE(sat)}$ represents the saturation voltage between the collector and emitter of the motor drive power transistor. As will be seen from Exp. 1, the higher the the maximum angular velocity $_{max}$ required of the motor output shaft, the higher source voltage is required for the motor.

Assuming, on the other hand, that the servomotor is to be accelerated with the supply of a constant current, the total power consumption P of the motor drive power transistor during spacing movement of the printer carriage is given by the following expression:

$$P = \frac{I_a \int_0^{t_1} (V_S - R_a \cdot I_a - K_E \cdot \omega_1) dt + I_d \int_0^{t_2} (V_S - R_a \cdot I_a - K_E \cdot \omega_2) dt}{t_1 + t_2} \qquad \text{Exp. 2}$$

where $I_a$ represents the constant current supplied to the motor under acceleration, $t_1$ represents the period of time for which the motor is accelerated, $t_2$ represents the period of time of for which the motor is decelerated until the motor is brought to a stop, $\omega_1$ represents the angular velocity of the motor output shaft being accelerated, $\omega_2$ represents the angular velocity of the motor output shaft being decelerated, and $I_d$ represents the mean value of the current supplied to the motor during deceleration. Here, it may be noted that the current $I_a$ during acceleration is larger than the current $I_d$ during deceleration since ordinarily the rate of deceleration is approximately one half of the rate of acceleration and since the motor is subjected to not only an inertial load but a friction torque during acceleration and deceleration. From Exp. 2 it will be seen that the higher the source voltage $V_S$ and/or the lower the angular velocity $\omega_1$ of the motor output shaft under deceleration, the larger the total power consumption of the motor drive power transistor.

Thus, in order that a servomotor to drive the carriage of a serial printer be enabled to produce a revolution speed required for the carriage return or tabulating movement of the carriage, it is desirable that the servomotor be supplied with a voltage which is high enough to satisfy the relation of Exp. 1. Increasing the source voltage for the servomotor to such an extent however gives rise to an increase in the total power consumption of the motor drive power transistor during spacing movement of the carriage when the printer carriage is driven at relatively low speed, as will be seen from Exp. 2. The increase in the total power consumption in turn might invite an overheat of the transistor and, to preclude an occurrence of such an accident, provision of extra cooling means would be required for the power transistor. Provision of such extra cooling means would result in increases in the production cost, weight and size of the serial printer as a whole. The heat generated from the motor drive power transistor would cause deterioration of the performance reliability of the printer.

As means to enable a motor to operate at an increased speed without increasing the power consumption of a motor drive power transistor, a chopper switch of the "H" type is used which is adapted to chop the base current of the motor drive power transistor to turn on and off the current to be supplied to the motor. One of the problems encountered by the use of such a switch circuit is that sound noises are produced by the switching actions of the chopper switch which occur at frequencies mostly falling within the audible range. Another problem is the generation of disturbances which are produced by the repeated cutoffs of the motor drive power transistor and which are liable to cause errors in the operation of the circuits and circuit elements operatively associated with the power transistor.

It is, accordingly, an important object of the present invention to provide an improved servomotor drive system capable of driving a servomotor without causing the motor drive transistor to consume an unduly large amount of power especially when the servomotor is required to operate at relatively low speeds, although the servomotor is energized with a sufficiently high voltage when required to operate at increased speeds.

It is another important object of the present invention to provide an improved servomotor drive system which is constructed and arranged so that the motor drive transistor forming part of the system is prevented from being unduly heated especially when the servomotor is required to operate at relatively low speeds.

It is still another important object of the present invention to provide an improved motor drive system capable of energizing a servomotor from a high voltage source when the servomotor is required to operate at relatively high speeds and from a low voltage source when the servomotor is required to operate at relatively low speeds.

Yet, it is another important object of the present invention to provide an improved servomotor drive system which is low in production cost, simple and compact in construction, reliable in performance and silent in operation.

SUMMARY OF THE INVENTION

In accordance with the present invention, there is provided a drive system for a servomotor, comprising a source of a variable command signal representative of the speed at which the servomotor is to operate, motor speed detecting means for detecting the output speed of the servomotor and producing a detected speed signal representative of the detected output speed of the servomotor, first and second voltage sources respectively operative to supply predetermined voltages, the voltage from the first voltage source being higher than the voltage from the second voltage source, switching means responsive to the detected speed signal from the detecting means and operative to select the first voltage source when the detected speed signal is increased in magnitude to a first threshold level and select the second voltage source when the detected speed signal is decreased in magnitude to a second threshold level lower than the first threshold level, and drive means responsive to the command signal and operative to provide a path of current from the voltage source selected by the switching means to the servomotor.

BRIEF DESCRIPTION OF THE DRAWINGS

The features and advantages of a motor drive system according to the present invention will be more clearly appreciated from the following description taken in conjunction with the accompanying drawings in which:

FIG. 3 is a view showing the detailed circuit arrangement of the embodiment shown in FIG. 1.

DESCRIPTION OF THE PREFERRED EMBODIMENT

Figure 1:
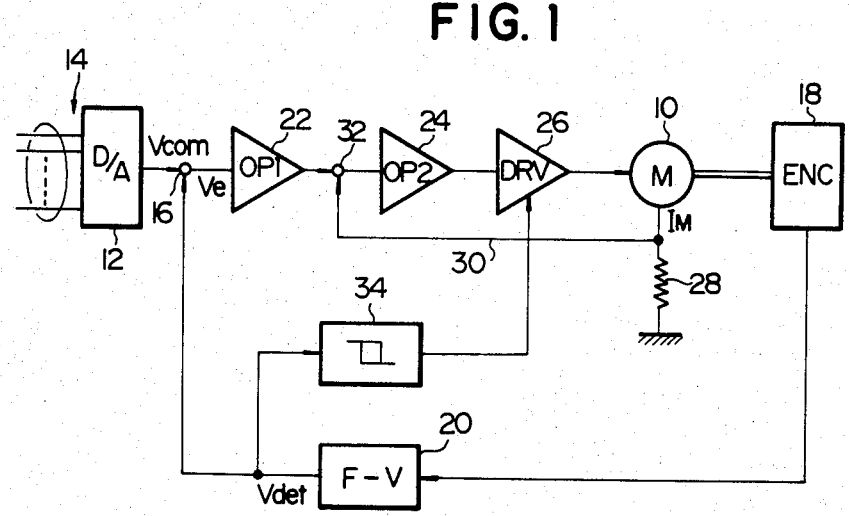
FIG. 1 is a block diagram schematically showing a preferred embodiment of a motor drive system according to the present invention.

In FIG. 1 of the drawings, a reversible d.c. servomotor to drive the carriage of a serial printer (not shown) is schematically indicated at 10. Servomotor 10 operates to drive the carriage for spacing movement from one printing position to another, for carriage return movement from an end-of-the-line position to a preset position, and for tabulating movement from a preset left-margin position to a tabulation stop position.

A motor drive system according to the present invention is adapted to drive the servomotor 10 and comprises a digital-to-analog converter 12 (D/A) having input terminals connected to a suitable source of command signals such as a print control unit of a computer or a word processor (not shown) through data bus lines 14. Binary data to dictate the speed at which servomotor 10 is to operate are thus converted by digital-to-analog converter 12 into an analog command signal $V_{com}$ which appears at the output terminal of converter 12.

Figure 2:
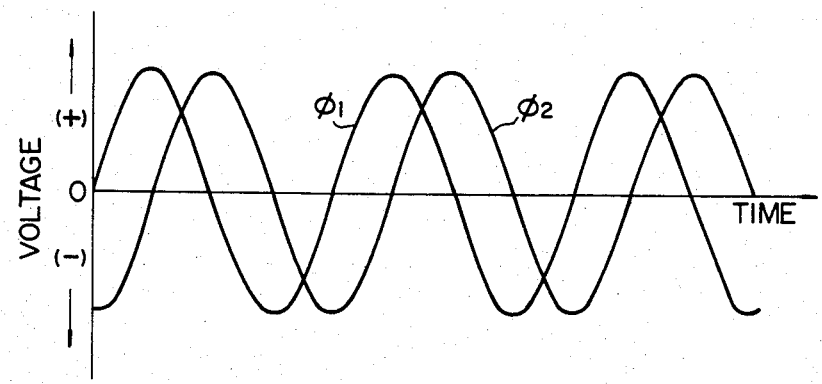
FIG. 2 is a diagram showing the detailed circuit arrangement of the motor drive system illustrated in FIG. 1.

In the motor drive system embodying the present invention, the analog command signal $V_{com}$ produced by digital-to-analog converter 12 is supplied to a first summing network 16 for comparison with a signal representative of a detected motor speed to find out an error, if any, between the speed represented by the command signal and the detected motor speed. For this purpose, suitable motor speed detecting means is provided in conjunction with the servomotor 10 to detect the output speed of the motor 10. Such motor speed detecting means is herein assumed to be constituted by the combination of a rotary encoder 18 (ENC) and a frequency-to-voltage converter 20 (F-V). The rotary motor-speed encoder 18 is, for example, of the electromagnetic or optical type mechanically or otherwise coupled to the output shaft of servomotor 10. Encoder 18 is thus operative to produce two sine-wave signals $\phi_1$ and $\phi_2$ with frequencies variable with the detected output speed of motor 10. The sine-wave signals $\phi_1$ and $\phi_2$ are 90 degrees out of phase with each other as indicated in FIG. 2 of the drawings. These two sine-wave signals $\phi_1$ and $\phi_2$ are fed to frequency-to-voltage converter 20 and are thereby converted into a voltage which is continuously variable with the frequencies of the sine-wave signals $\phi_1$ and $\phi_2$ and is representative of the detected output speed of the motor 10. The voltage produced by frequency-to-voltage converter 20 forms a detected speed signal $V_{det}$ and is representative of the output speed of servomotor 10 as detected by encoder 18. Frequency-to-voltage converter 20 has an output terminal connected to the previously mentioned first summing network 16 to produce an error signal $V_e$ representative of the difference, if any, between voltages of the command signal $V_{com}$ delivered from digital-to-analog converter 12 and the detected speed signal $V_{det}$ delivered from frequency-to-voltage converter 20. Thus, the first summing network 16 serves as error detecting means in the shown embodiment of the system according to the present invention.

The error signal $V_e$ is amplified by means of a series combination of a first or speed-control operational amplifier network 22 (OP1) and a second or current-control operational amplifier network 24 (OP2) and the resultant voltage signal is supplied to a motor driver circuit 26 (DRV). Servomotor 10 is energized with a current variable with the voltage signal thus supplied to motor driver circuit 26. As will be described in more detail, driver circuit 26 is constructed and arranged to supply servomotor 10 with a current controlled in such a manner as to elliminate the above mentioned error signal $V_e$, viz., to have the output speed of servomotor 10 approximately equalized with the speed represented by the original digital command signals supplied to digital-to-analog converter 12. In this instance, a voltage variable with the current, $I_M$, supplied to motor 10 appears across a resistance 28 connected between motor 10 and ground. The voltage thus variable with the motor drive current $I_M$ is fed back through a line 30 to a second summing network 32 provided between operational amplifier networks 22 and 24 and is subtracted from the amplified error signal delivered from speed-control operational amplifier network 22. The current to be supplied to servomotor 10 is in this fashion maintained lower than a predetermined maximum value s that servomotor 10 is prevented from being energized with an excess of current.

In accordance with the present invention, the motor drive system having the basic construction described above is provided with first and second voltage sources for driver circuit 26 and switching means adapted to select one of the two voltage sources depending upon the speed at which servomotor 10 is operated. The first and second voltage sources are such that the voltage from the first voltage source is higher than the voltage from the second voltage source. The switching means is responsive to the detected speed signal $V_{det}$ from frequency-to-voltage converter 20 and is operative to select the first voltage source when the detected speed signal $V_{det}$ is increased in voltage to a first predetermined threshold level and select the second voltage source when the detected speed signal is decreased in voltage to a second predetermined threshold level lower than the first threshold level.

In a preferred embodiment of a motor drive system according to the present invention, such switching means comprises a Schmitt trigger circuit 34 which has an input terminal connected to the output terminal of frequency-to-voltage converter 20 and an output terminal connected to a control terminal of driver circuit 26. Schmitt trigger circuit 34 is thus responsive to the output voltage $V_{det}$ from frequency-to-voltage converter 20 and is operative to produce an output signal of a low voltage level when the voltage $V_{det}$ rises up to a first threshold level $V_{T+}$ and an output signal of a high voltage level when the voltage $V_{det}$ falls down to a second threshold level $V_{T-}$ which is slightly lower than the first threshold level $V_{T+}$. In this instance, each of the threshold levels $V_{T+}$ and $V_{T-}$ may be either fixed or adjustable. Supplied with a signal of the low voltage level from Schmitt trigger circuit 34, motor driver circuit 26 operates to shift the source voltage for servomotor 10 from a positive or negative low voltage level $V_L$ or $-V_L$ to a positive or negative high voltage level $V_H$ or $-V_H$ depending upon the polarity of the error signal supplied to driver circuit 26. In response to a signal of the high voltage level from circuit 34, on the other hand, driver circuit 26 operates to shift the source voltage for motor 10 conversely from the high voltage level $V_H$ or $-V_H$ to the low voltage level $V_L$ or $-V_L$ depending upon the polarity of the error signal supplied to driver circuit 26, as will be understood more clearly as the description proceeds.

Figure 4:
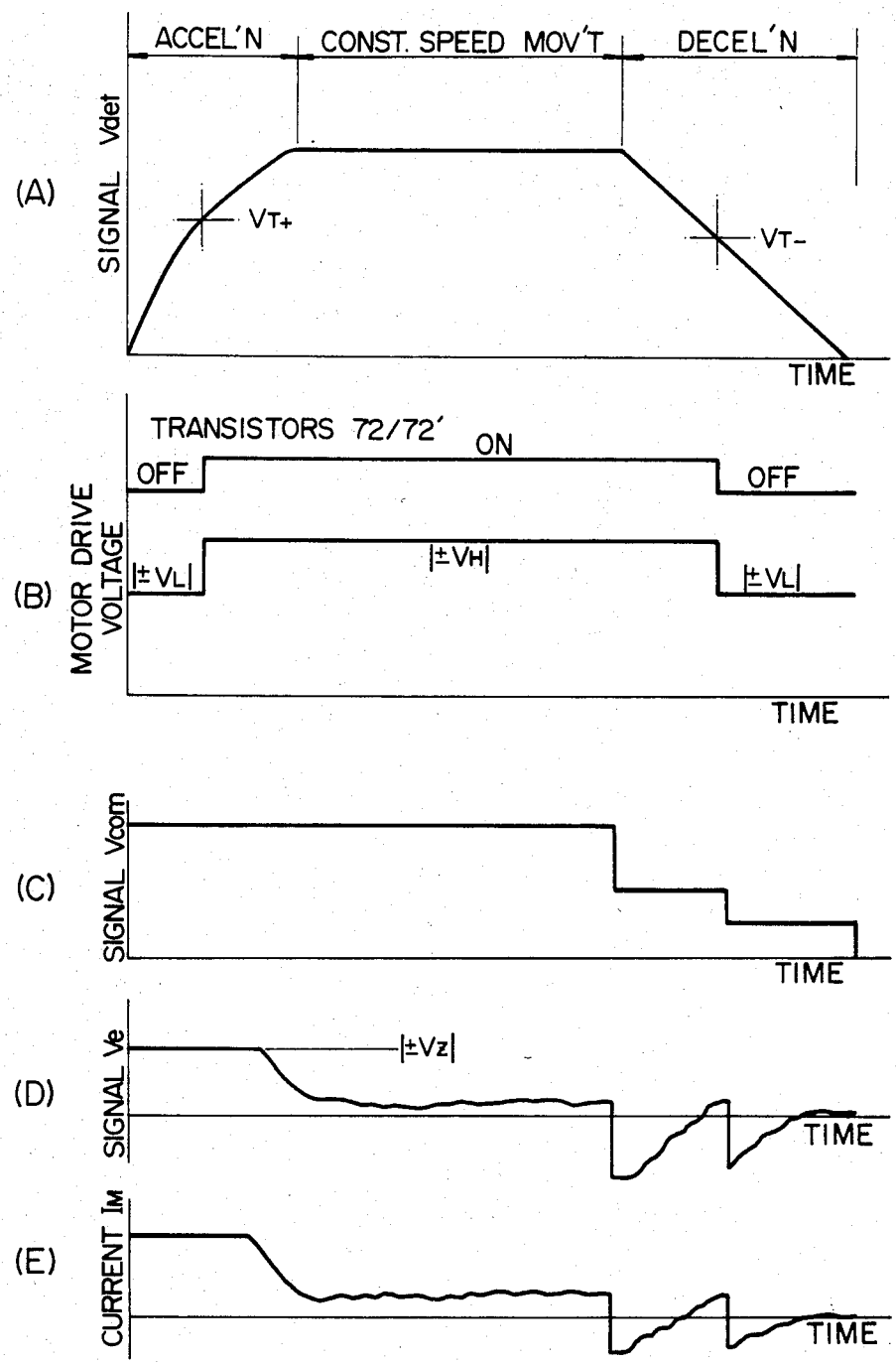
FIG. 4 is a graphic representation of the waveforms of various signals which appear in the circuit arrangement of FIG. 3.

FIG. 3 of the drawings shows the detailed circuit arrangement of the embodiment hereinbefore described with reference to FIG. 1, while FIG. 4 shows waveforms of various signals which appear in the circuit arrangement of FIG. 3.

In FIG. 3, the first or speed-control operational amplifier network 22 is shown as being of the integrator type and comprises an operational amplifier 36 having inverting and non-inverting input terminals and a feedback resistor 38 parallelled by a capacitor 40. The inverting input terminal of amplifier 36 is connected to first summing network 16 and accordingly to the output terminal of frequency-to-voltage converter 20 which is shown in block form at the bottom of FIG. 3. The non-inverting input terminal of amplifier 36 is grounded through a resistor 42 which serves as a source of a reference voltage for amplifier 36. The output terminal of operational amplifier 36 is connected through a resistor 44 and a diode 46 to clamp means (not shown) with a predetermined positive clamp level $+V_Z$ and to clamp means with a predetermined negative clamp voltage $-V_Z$ through the resistor 44 and a diode 46'. Each of these clamp means may comprise a diode. On the other hand, the second or current-control operational amplifier network 24 comprises an operational amplifier 48 having inverting and non-inverting input terminals and a feedback resistor 50. The inverting input terminal of amplifier 48 is connected through a resistor 52 to output terminal 32 of amplifier 36 and through a resistor 54 to the previously mentioned line 30 leading from servomotor 10. The non-inverting input terminal of amplifier 48 is grounded through a resistor 56 which serves as a source of a reference voltage for amplifier 48. The non-inverting input terminal of amplifier 48 is further connected through the series combination of resistor 56 and a resistor 58 to line 30 so that the previously mentioned resistance 28 (FIG. 1) is constituted by the combination of resistors 54 and 58. Current-control operational amplifier network 24 thus constructed and arranged is connected through a resistor 60 to the input terminal of motor driver circuit 26.

On the other hand, frequency-to-voltage converter 20 has its output terminal connected to first summing network 16 and further to the input terminal of Schmitt trigger circuit 34 as previously described. Schmitt trigger circuit 34 in turn has its output terminal connected to the input terminal of a first inverter 62. First inverter 62 has its output terminal connected to the base of a first switching transistor 64 of the npn type and further to the input terminal of a second inverter 62'. Second inverter 62' has its output terminal connected to the base of a second switching transistor 64' of the pnp type through a resistor 66'. First switching transistor 64 has its emitter grounded and its base connected to a suitable constant positive voltage source $V_{cc}$ through a pull-up resistor 66. A resistor 68 is connected between the base and emitter of switching transistor 64 for establishing a bias voltage therebetween. Second switching transistor 64' has its emitter biased from a constant positive voltage source $V_{cc}$ with a resistor 68' connected between the base and emitter of transistor 64' for establishing a bias voltage therebetween. The collectors of first and second switching transistors 64 and 64' are connected through resistors 70 and 70' to the bases of third and fourth switching transistors 72 and 72', respectively. Third switching transistor 72 is of the pnp type and has its emitter connected to a source of a positive high voltage $+V_H$ and a bias voltage is established between the base and emitter of transistor 72 by means of a resistor 74 connected therebetween. Fourth switching transistor 72' is of the npn type and has its emitter connected to a source of a negative high voltage $-V_H$ and a bias voltage is established between the base and emitter of transistor 72' by means of a resistor 74' connected therebetween. Schmitt trigger circuit 34, inverters 62 and 62' and transistors 64, 64', 72 and 72' arranged as above described constitute, in combination, the previously mentioned switching means in a motor drive system according to the present invention. Furthermore, each of transistors 64 and 64' constitutes a first semiconductor switching element and each of transistors 72 and 72' constitutes a second semiconductor switching element in a motor drive system according to the present invention.

The collector of third switching transistor 72 is connected to the emitter of a first motor drive transistor 76 of the pnp type and the collector of fourth switching transistor 72' is connected to the emitter of a second motor drive transistor 76' of the pnp type. The emitter of first motor drive transistor 76 is connected in parallel to the collector of transistor 72 and through a diode 78 to a source of a positive low voltage $+V_L$ and, similarly, the emitter of second motor drive transistor 76' is connected in parallel to the collector of transistor 72' and through a diode 78' to a source of a negative low voltage $-V_L$. The collectors of motor drive transistors 76 and 76' are connected to the positive and negative terminals, respectively, of servomotor 10 and to ground commonly through a series combination of resistors 80 and 82.

Inverters 62 and 62', transistors 64 and 64', transistors 72 and 72' and transistors 76 and 76' arranged as above described form part of the motor driver circuit 26, which further comprises first and second control transistors 84 and 84' of the pnp and npn types, respectively. Control transistors 84 and 84' have their respective bases connected in parallel to current-control operational amplifier network 24 through a resistor 60 and their respective emitters grounded jointly through the above mentioned resistor 82. The collector of first control transistor 84 is connected in parallel to the source of the positive high voltage $+V_H$ through third switching transistor 72 and a resistor 86 and to the source of the positive low voltage $+V_L$ through resistor 86 and diode 78. Likewise, the collector of second control transistor 84' is connected in parallel to the source of the negative high voltage $-V_H$ through fourth switching transistor 72' and a resistor 86' and to the source of the negative low voltage $-V_L$ through resistor 86' and diode 78', as shown. Resistor 86 establishes a bias voltage between the emitter and base of first motor drive transistor 76 and, similarly, resistor 86' establishes a bias voltage between the emitter and base of second motor drive transistor 76'. A protective diode 88 is connected between the collector of first motor drive transistor 76 and the source of the positive high voltage $+V_H$ in a forward direction to the voltage source and, likewise, a protective diode 88' is connected between the collector of second motor drive transistor 76' and the source of the negative high voltage $-V_H$ in a forward direction to the voltage source. Motor drive transistors 76 and 76' and control transistors 84 and 84' arranged as above described constitute drive means for servomotor 10 in a motor drive system according to the present invention.

Description will be hereinafter made with concurrent reference to FIGS. 1 to 4 regarding the operation of the motor drive system thus constructed and arranged in accordance with the present invention.

When digital command signals representative of a target output speed and a desired direction of rotation of servomotor 10 are fed through lines 14 to digital-to-analog converter 12 (FIG. 1) for starting servomotor 10, an analog command signal $V_{com}$ resulting from the digital command signals appears at the output terminal of digital-to-analog converter 12. On the other hand, encoder 18 produces sine-wave signals $\phi_1$ and $\phi_2$ (FIG. 2) variable in frequency with the detected motor output speed. These sine-wave signals $\phi_1$ and $\phi_2$ are converted into a voltage signal $V_{det}$ representative of the detected motor output speed by means of frequency-to-voltage converter 20. The voltage signal $V_{det}$ is supplied to summing network 16 so that an error signal $V_e$ representative of the difference between the target and detected output speeds of servomotor 10 is fed to amplifier 36 of speed-control operational amplifier network 22. The error signal $V_e$ thus produced at the output terminal of summing network 16 has a polarity corresponding to the desired direction of rotation of servomotor 10, viz., the direction in which the carriage of the serial printer is to be driven for movement. If, in this instance, the voltage of the error signal $V_e$ with the positive or negative polarity happens to be higher in absolute value than the predetermined clamp voltage $+V_Z$ or $-V_Z$, the error voltage $V_e$ is clamped at the particular voltage level $+V_Z$ or $-V_Z$ as will be seen from graph (D) of FIG. 4. The error signal $V_e$ amplified by operational amplifier network 22 is further amplified by amplifier 48 of current-control operational amplifier network 24 and is thence supplied to the bases of first and second control transistors 84 and 84'.

The detected speed signal $V_{det}$ produced by frequency-to-voltage converter 20 is supplied not only to summing network 16 but to Schmitt trigger circuit 34. Before servomotor 10 is started, the input voltage of Schmitt trigger circuit 34 is maintained lower than the first and second threshold levels $V_{T+}$ and $V_{T-}$ of circuit 34, which is thus operative to produce an output signal of a high voltage level. The signal delivered from Schmitt trigger circuit 34 is converted by first inverter 62 into a signal with a low voltage level. The output signal from inverter 62 is further converted into a signal with a high level by second inverter 62'. In the presence of the signal with a low voltage level at the output terminal of inverter 62 and in the presence of the signal with a high voltage level at the output terminal of inverter 62', both first and second switching transistors 64 and 64' remain in non-conduction state. Transistors 64 and 64' being thus maintained non-conductive, third and fourth switching transistors 72 and 72' are also maintained in non-conduction state so that motor drive transistors 76 and 76' are disconnected from the sources of the high voltages $+V_H$ and $-V_H$, respectively. Under these conditions, transistors 76 and 76' are connected to the sources of the low voltages $+V_L$ and $-V_L$ through diodes 78 and 78', respectively.

If the error signal $V_e$ produced at first summing network 16 as above described is of the positive polarity, the voltage signal from operational amplifier 48 causes first control transistor 84 to turn on and, if the error signal $V_e$ is of the negative polarity, the voltage signal from amplifier 48 causes second control transistor 84' to turn on. When either transistor 84 or transistor 84' is rendered into conduction state, first or second motor drive transistor 76 or 76', respectively, is caused to turn on and causes first or second motor drive transistor 76 or 76' to turn on. Accordingly, the low voltage $+V_L$ or $-V_L$ is supplied through diode 78 or 78' and transistor 76 or 76', respectively, to servomotor 10, which is thus actuated to operate at a speed dictated by the voltage applied to the base of control transistor 84 or 84'. After servomotor 10 is started in this manner, a voltage corresponding to the current $I_M$ supplied to the motor is supplied through resistor 54 to the inverting input terminal of operational amplifier 48 so that the motor drive current $I_M$ is maintained constant.

When servomotor 10 thus started into operation is accelerated in response to the command signals applied to digital-to-analog converter 12, the output signal from Schmitt trigger circuit 34 reaches the first threshold level $V_{T+}$. A signal with a low voltage level now appears at the output terminal of Schmitt trigger circuit 34 as will be seen from graph (A) of FIG. 4 and is converted into a signal with a high voltage level by first inverter 62. The output signal from inverter 62 is applied to the base of first switching transistor 64 and causes transistor 64 to turn on. The signal from inverter 62 is also fed to second inverter 62' and is converted into a signal with a low voltage level, which is applied to the base of second switching transistor 64'. Both of first and second switching transistors 64 and 64' are thus saturated and rendered into conduction state, causing third and fourth switching transistors 72 and 72' to turn on as will be seen from graph (B) of FIG. 4. It therefore follows that the high voltage $+V_H$ or $-V_H$ is supplied through transistor 72 or 72' and motor drive transistor 76 or 76' to servomotor 10, which is thus energized from the source of the voltage $+V_H$ or $-V_H$ and which is caused to operate at a speed dictated by the voltage applied to the base of control transistor 84 or 84'.

As the printer carriage driven by servomotor 10 approaches the target position, the motor speed represented by the command signals supplied to digital-to-analog converter 12 decreases progressively and cause servomotor 10 to decelerate. As the output speed of servomotor 10 is reduced, the voltage level of the detected speed signal $V_{det}$ produced by frequency-to-voltage converter 20 decreases accordingly. When the signal $V_{det}$ reaches the second threshold level $V_{T-}$ of Schmitt trigger circuit 34, the output signal from circuit 34 is shifted to a signal with a high voltage level. The signal with the high voltage level is converted by first inverter 62 into a signal with a low voltage level. The output signal from inverter 62 is further converted into a signal with a high level by second inverter 62'. First and second switching transistors 64 and 64' are therefore rendered into non-conduction state so that third and fourth switching transistors 72 and 72' are also turned off. Motor drive transistors 76 and 76' are now disconnected from the sources of the high voltages $+V_H$ and $-V_H$, respectively, and are connected to the sources of the low voltages $+V_L$ and $-V_L$ through diodes 78 and 78', respectively. Servomotor 10 is thus energized from the source of the low voltage $+V_L$ or $-V_L$ for a second time.

At the moment when the drive voltage for servomotor 10 is shifted from the high voltage $+V_H$ or $-V_H$ to the low voltage $+V_L$ or $-V_L$, the output shaft of servomotor 10 turns at an angular velocity $\omega_s$ (rad/sec) which satisfies the following relationship:

$$\omega_s \leqq \frac{V_L - R_a \cdot I_a - V_{CE(sat)}}{K_E} \qquad \text{Exp. 3}$$

The voltage source for servomotor 10 being shifted from the high level $+V_H$ or $-V_H$ to the low voltage $+V_L$ or $-V_L$ or vice versa at such a motor speed, servomotor 10 is energized from the source of the high voltage $+V_H$ or $-V_H$ when servomotor 10 is operating at speeds higher than the particular speed and from the source of the low voltage $+V_L$ or $-V_L$ when servomotor 10 is operating at speeds lower than the particular speed. This means that the source voltage $V_S$ for servomotor 10 as contained in Exp. 2 is equal to the high voltage level $+V_H$ or $-V_H$ only during operation of the motor at relatively high speeds and is reduced to the low voltage level $+V_L$ or $-V_L$ during operation of the motor at relatively low speeds. The voltage $V_{CE}$ developed between the collector and emitter of each of motor drive transistors 76 and 76' and accordingly the power consumption by each of these transistors are for this reason lower during operation of servomotor 10 at relatively low speeds than during operation of the motor at relatively high speeds.

What is claimed is:

1. A drive system for a servomotor, comprising
   a source of a variable command signal representative of the speed at which the servomotor is to operate,
   motor speed detecting means for detecting the output speed of the servomotor and producing a detected speed signal representative of the detected output speed of the servomotor,
   first and second voltage sources respectively operative to supply predetermined voltages, the voltage from the first voltage source being higher than the voltage from the second voltage source,
   switching means responsive to the detected speed signal from said detecting means and operative to select the first voltage source when the detected speed signal is increased in magnitude to a first threshold level and select the second voltage source when the detected speed signal is decreased in magnitude to a second threshold level lower than the first threshold level, and
   drive means responsive to said command signal and operative to provide a path of current from the voltage source selected by said switching means to the servomotor.

2. A drive system as set forth in claim 1, in which said switching means comprises a Schmitt trigger circuit having said first and second threshold levels and having an input terminal connected to said motor speed detecting means.

3. A drive system as set forth in claim 1, in which said motor speed detecting means comprises an encoder associated with said servomotor and operative to produce a signal variable with the output speed of the servomotor, and a frequency-to-voltage converter connected between the encoder and said switching means and operative to convert the signal from the encoder into a detected speed signal continuously variable with said frequency.

4. A drive system as set forth in claim 3, in which said switching means comprises a Schmitt trigger circuit having said first and second threshold levels and having an input terminal connected to the output terminal of said frequency-to-voltage converter.

5. A drive system as set forth in claim 4, in which said Schmitt trigger circuit is operative to produce an output signal of a low voltage level when said detected speed signal is increased to said first threshold level and an output signal of a high voltage level when said detected speed signal is decreased to said second threshold level, said switching means further comprising an inverter operative to convert said signals of high and low voltage levels into signals of low and high voltage levels, respectively, a first semiconductor switching element having conduction and non-conduction states in the presence of the signal of the high and low voltage levels, respectively, at the output terminal of said inverter, and a second semiconductor switching element connected between said first voltage source and said drive means and having conduction and non-conduction states responsive to the conduction and non-conduction states, respectively, of the first semiconductor switching element.

6. A drive system as set forth in claim 4, in which said Schmitt trigger circuit is operative to produce an output signal of a low voltage level when said detected speed signal is increased to said first threshold level and an output signal of a high voltage level when said detected speed signal is decreased to said second threshold level, said switching means further comprising a first semiconductor switching element having conduction and non-conduction states in the presence of the signals of the low and high voltage levels, respectively, at the output terminal of said Schmitt trigger circuit, and a second semiconductor switching element connected between said first voltage source and said drive means and having conduction and non-conduction states responsive to the conduction and non-conduction states, respectively, of the first semiconductor switching element.

7. A drive system as set forth in claim 6, further comprising error detecting means responsive to said command signal and to said detected speed signal and operative to produce an error signal representative of the difference in magnitude, if any, between the command signal and the detected speed signal, said drive means comprising a control transistor having its base responsive to said error signal, and a motor drive transistor having its base connected to the collector of the control transistor, its emitter connected in parallel to said first voltage source across said second semiconductor switch element and to said second voltage source, and its collector connected to said servomotor.

8. A drive system as set forth in claim 7, further comprising feedback means for subtracting from said command signal a voltage variable with the current supplied to the servomotor.

* * * * *